United States Patent [19]

Suzuki et al.

[11] Patent Number: 4,678,052
[45] Date of Patent: Jul. 7, 1987

[54] POWER STEERING APPARATUS

[75] Inventors: Yoshio Suzuki; Seiji Yamaguchi, both of Saitama, Japan

[73] Assignee: Jidosha Kiki Co., Ltd., Tokyo, Japan

[21] Appl. No.: 711,438

[22] Filed: Mar. 13, 1985

[30] Foreign Application Priority Data

Mar. 13, 1984 [JP] Japan ............................ 59-34893[U]

[51] Int. Cl.$^4$ ............................................. B62D 5/08
[52] U.S. Cl. ...................................... 180/143; 91/452
[58] Field of Search ..................... 180/143, 141, 132; 91/451, 452

[56] References Cited

U.S. PATENT DOCUMENTS

| | | | |
|---|---|---|---|
| 3,461,780 | 8/1969 | Schmon | 91/451 |
| 3,768,371 | 10/1973 | Orme | 91/451 |
| 4,159,723 | 7/1979 | Baatrup | 180/132 |
| 4,332,303 | 6/1982 | de Maight | 180/132 |
| 4,355,655 | 10/1982 | Hertell | 91/451 |

FOREIGN PATENT DOCUMENTS

57-205271 12/1982 Japan ....................................... 91/452

Primary Examiner—John A. Pekar
Attorney, Agent, or Firm—Sughrue, Mion, Zinn, Macpeak, and Seas

[57] ABSTRACT

A power steering apparatus is disclosed wherein improved steering characteristics are provided over a wide range of driving conditions. The system includes an oil pump for supplying pressurized oil from an oil tank to either a left or right cylinder chamber in a power cylinder and a flow control valve which returns part of the pressurized oil discharged from the oil pump to the tank. In accordance with the invention, at least one small orifice is provided communicating a pressurized oil feed line directed to one of the chambers in the power cylinder with a return line directed to the oil tank from the other one of the chambers in the power cylinder at the downstream side of the flow control valve.

8 Claims, 19 Drawing Figures

POWER STEERING APPARATUS

BACKGROUND OF THE INVENTION

The present invention relates to a power steering apparatus for reducing the force necessary to operate a steering apparatus for reducing the force necessary to operate a steeling wheel, and more particularly to a power steering apparatus which provides a suitable steering performance responsive to various car speeds and steering angles.

Figure 1:
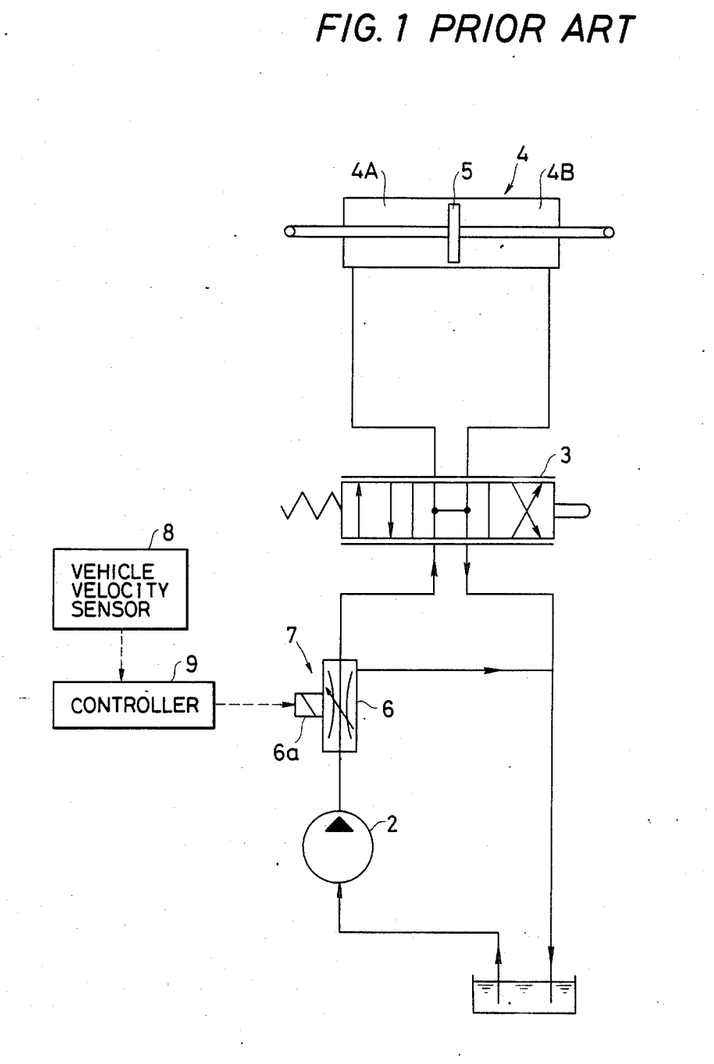
FIG. 1 is a diagram showing the construction of a conventional power steering apparatus.

A power steering apparatus of the type to which the invention relates includes, as shown in FIG. 1, an oil pump 2 which pumps hydraulic fluid out of an oil tank (reservoir) 1, develops a fluid pressure, and supplies the pressurized oil to a power steering body; a control valve 3 which controls the flow of the pressurized oil supplied from the oil pump 2 according to the steering operation; and a power cylinder 4 having a piston 5 selectively shiftable in the axial direction according to which the pressurized oil is caused to flow into either a left chamber 4A or a right chamber 4B. Such movement of the piston 5 in the power cylinder 4 due to the flow direction of the pressurized oil is transmitted to a steering linkage mechanism (not shown) to facilitate the steering operation. Further, in such a power steering apparatus, hydraulic circuits in the power cylinder 4 may be changed by rotary movement of a steering wheel. Conventionally, a rotary valve having a rotor and sleeve has been used as the control valve 3 so as to change the flow channels of the pressurized oil.

In the conventional power steering apparatus as described above, the oil pump 2 serving to develop fluid pressure is normally rotated by the engine of a car. The flow rate of the pressurized oil supplied from the oil pump 2 is thus varied in proportion to the rate of rotation of the engine. Also, the capacity of the oil pump 2 is established in such a manner that an appropriate amount of pressurized oil may be supplied from the oil pump 2 so as to reduce the force necessary to turn the steering wheel when the car is stopped or travels at low speeds. In this manner, when the engine rotates at normal or high speeds, the amount of the pressurized oil discharged from the oil pump 2 tends to be greater than that which needs be supplied to the power steering body. It is for this reason that, conventionally, a flow control valve operating in response to the differential pressure between an orifice and its adjacent area is provided in the pressurized oil feed line. With this arrangement, excess amounts of the pressurized oil are returned to the oil tank 1 so that the pressurized oil may be supplied in a constant manner. It is also known to provide a flow control valve operable by variable orifice for reducing the flow rate of the pressurized oil when the car travels at high speeds. With this arrangement, a greater steering force is required at high speeds than at low speeds. Thus, the driver is provided with the proper "feel" on the steering wheel at any given speed.

Furthermore, it is well known to provide a speed-sensitive power steering system which includes a flow control section 7 having a variable orifice 6 adapted to vary the opening area in the feed line by moving a valve rod toward or away from the orifice by means of a solenoid coil 6a, as shown in FIG. 1. With this arrangement, opening and closing of the variable orifice 6 may be controlled by a controller 9, which receives signals from a car speed sensor 8. Upon such control, the flow rate of the pressurized oil at high speeds may appropriately be reduced. Accordingly, the steering "feel" is made desirably heavier at high speeds.

Figure 2A:
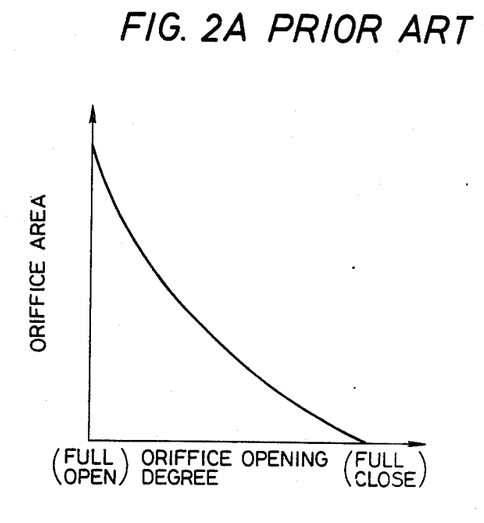
FIGS. 2A and 2B are graphic representations respectively showing the relationship between the state of opening and the opening area of the orifice in the prior art power steering apparatus and the relationship between the input torque and the rack thrust (steering force plus auxiliary steering force) in the prior art power steering apparatus.
Figure 2B:
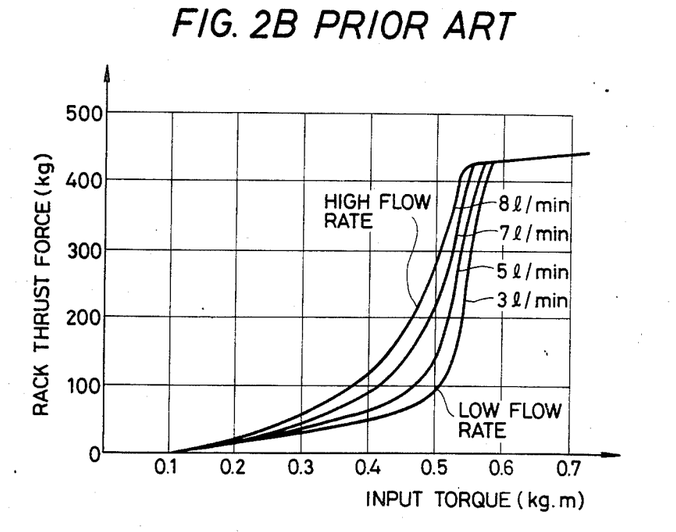
Figure 3A:
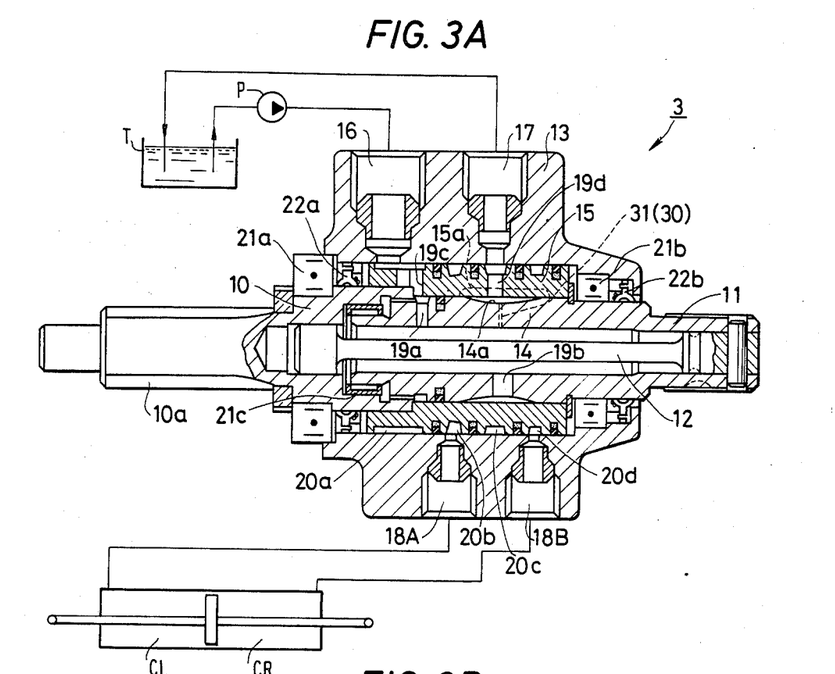
Figure 3B:
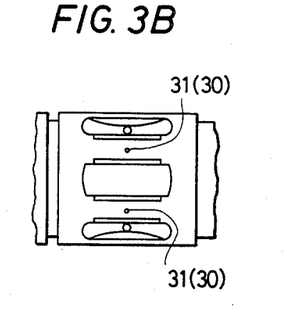

However, in such a prior art arrangement as above, only flow control is effected by the variable orifice 6. Accordingly, only slight changes in the flow rate of the pressurized oil in the feed line take place upon throttling the variable orifice 6 and the amount of variation in input torque (steering force) is therefore small. Namely, the prior art arrangement provides such characteristics as shown in FIG. 2A, representing the relationship between the state of opening and the opening area of the orifice, which is in proportion to the steering angle. Also, FIG. 2B shows the input torque in relation to the rack thrust (steering force plus auxiliary steering force by the present power steering apparatus). As is clear from FIGS. 2A and 2B, the difference between the flow rate of the pressurized oil when the variable orifice 6 is opened and that when the same is closed is small. Further, the relief pressure is constant and its variation with respect to steering force is small.

In order to appropriately control the steering force respective to car speed, there have previously been proposed arrangements such as disclosed in Japanese Laid-Open Patent Application No. 52-112922 and Laid-Open Utility Model Application No. 56-160174. However, these arrangements are complicated and require a large number of parts, and thus are costly. Furthermore, they are unable to provide suitable steering performance by establishing wide variations in the steering force. Hence, improved arrangements need be provided.

That is, in the former case, a by-pass line opened and closed by a valve provided in the feed line which extends from the oil pump to the power steering body for purposes of improving steering properties. However, this arrangement is complicated in structure. In addition, the flow of the pressurized oil tends to increase as the pressure in the feed line increases, and thus flow control may not adequately be effected. It is for this reason that a pressure control valve arrangement need be provided.

Further, in the latter case, there is provided a by-pass valve which communicates the left cylinder chamber with the right cylinder chamber in the power cylinder. However, this arrangement is complicated in structure and requires a large number of parts, and thus is costly. Therefore, there is a need for an improved arrangement which is simple in structure and which effects flow control responsive to speed and provides wide variations in the steering force.

SUMMARY OF THE INVENTION

The present invention has been made in light of the foregoing. Specifically, overcoming the drawbacks of the prior art, the invention provides a power steering apparatus wherein a stationary orifice having a small opening is provided to communicate a pressurized oil feed line with a return line to an oil tank at the downstream side of a flow control valve. With this simple arrangement, wide variations in input torque may be obtained responsive to car speed. Thus, the steering wheel is provided with the appropriate "feel", namely, light at low and normal speeds and heavy at higher speeds. Further, the overall construction is simple, and each part may precisely be worked or assembled. In addition, easy application is possible to the conventional apparatus, yet the desired effects easily obtained. More-over, upon changing the opening area of the orifice, a suitable steering force is established responsive to the steering angle or the like, serving to provide excellent steering properties.

BRIEF DESCRIPTION OF THE DRAWINGS

FIGS. 3A and 3B through 6A and 6B are vertical sectional views and enlarged views, respectively, showing respective embodiments of the invention wherein the power steering apparatus according to the present invention is applied to a flow channel switch valve;

DESCRIPTION OF THE PREFERRED EMBODIMENTS

The present invention will now be described in greater detail by way of examples shown in the drawings.

In the respective embodiments shown in FIGS. 3A and 3B through FIGS. 6A and 6B, in a power steering apparatus according to the present invention, the flow channels of the rotary control valve 3 are changed from the prior art arrangement.

In these figures, the construction of the control valve 3 will first be described in brief. Reference numeral 10 designates an output shaft having a pinion 10a which meshes with a rack (not shown) located at its right end. Reference numeral 11 designates an input shaft connected in coaxial relation to the right end of the pinion shaft 10 via torsion bar 12, the right end of the input shaft 11 being connected to the steering wheel (not shown). Reference numeral 13 designates a housing for the control valve 3 through which the shafts 10 and 11 extend. The flow channels between an oil pump P and an oil tank T and between left cylinder chamber CL and a right cylinder chamber CR in a power cylinder are determined by the relative rotary displacement of a rotor 14 and a sleeve 15, which are coupled to the shafts 11 and 10, respectively, are rotatably supported in the housing 13. The rotor 14 and the sleeve 15 are of a conventional type. Hydraulic circuits in the housing 13 also have a known structure. The outer peripheral surface of the rotor 14 is in sliding engagement with the inner peripheral surface of the oppositely disposed sleeve 15. Formed at the outer peripheral surface of the rotor 14 and the inner peripheral surface of the sleeve 15 are circumferentially spaced passage slots 14a and 15b, respectively. The hydraulic circuits may be changed by selectively communicating the passage slot 14a with the passage slot 15a. Reference numerals 16 and 17 respectively designate an input port into which the pressurized oil flows from the oil pump P and a return port through which oil is returned to the oil tank T. Reference numerals 18A and 18B respectively designate left and right discharge ports connected to the left and right cylinder chambers CL and CR in the power cylinder. Reference numerals 19a and 19b designate passsage holes formed in the rotor 14. Also reference numerals 19c and 19d designate passage holes formed in the sleeve 15. Reference numerals 20a, 20b, 20c and 20d respectively designate bearings adapted to rotatably support the respective parts. Reference numerals 22a and 22b designate oil seals. Since this much of the structure and the operation of the rotary control valve 3 are well known in the art, a further detailed description thereof will be omitted. Further, the typical structural relationship between the sleeve and the rotor is described in Japanese Utility Model Publication No. 53-20097.

According to the present invention, in the power steering apparatus having the control valve 3 constructed as above, in order to appropriately control the flow of the pressurized oil supplied to the control valve 3 responsive to speed so as to provide wide variations in the flow rate thereof, a fixed orifice 30 having a small opening is so provided as to communicate the pressurized oil feed line directed to either one of the chambers (CL and CR) in the power cylinder with the return line directed to the oil tank T from the other chamber downstream of the control valve 3.

Namely, in the power steering apparatus according to the present invention, the left and right cylinder chambers CL and CR are brought into fluid communication with each other via the small flow channel provided by the stationary orifice 30. The cylinder chambers CL and CR will be either on the high pressure side or low pressure side depending upon the operative condition. Increases in pressure in the pressurized oil feed line are regulated by leakage of the pressurized oil resulting from the above arrangement. Further, the flow of the pressurized oil is properly regulated so as to provide wide variations in the flow rate thereof. Particularly, by making the flow rate smaller, a heavy steering performance, similar to manual steering properties, is obtained.

Examples of the stationary orifice 30 will be described with reference to FIGS. 3A and 3B through FIGS. 6A and 6B. In a first embodiment shown in FIGS. 3A and 3B, radially extending small holes 31 are formed in the rotor 14. These holes 31 are open to the passage slots 15a connected to the oil tank T at the sleeve 15, whereby the pressurized oil in the central hole of the rotor 14 (which is connected to the oil pump P and high pressure side) is returned to the low pressure side.

Figure 4:
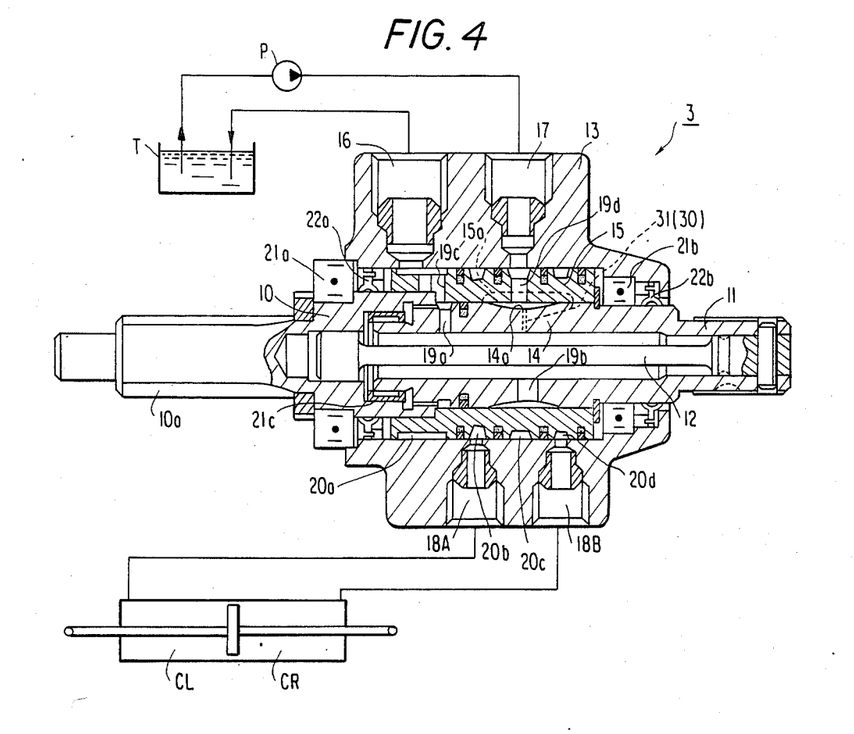
Figure 4A:
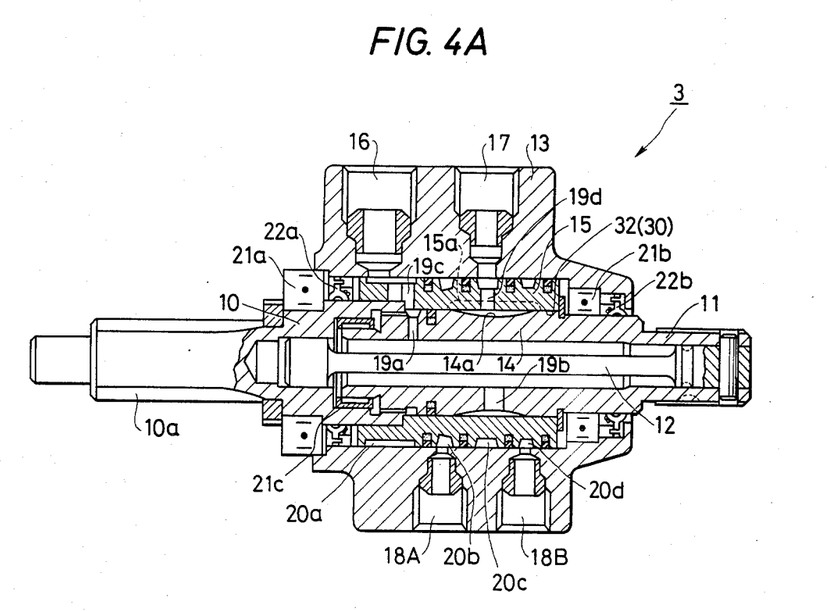
Figure 4B:
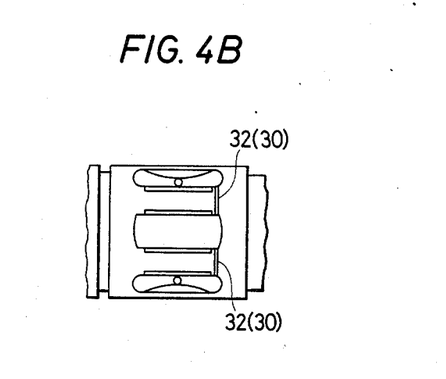

In a second embodiment shown in FIGS. 4A and 4B, narrow communication slots 32 are circumferentially formed on the outer surface the rotor 14 so as to interconnect the passage slots 14a formed at the outer periphery of the rotor 14. It will be readily understood that the oil pump P is connected to the oil tank T by means of these communication slots 32.

Figure 5A:
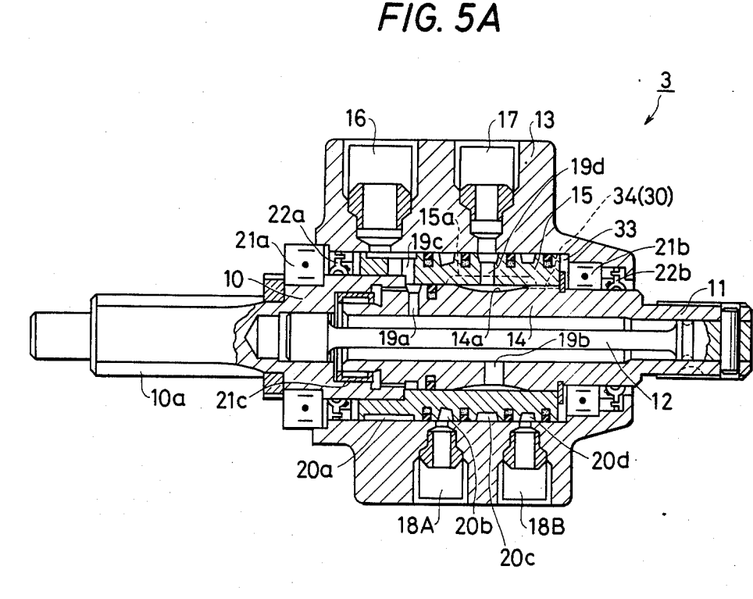
Figure 5B:
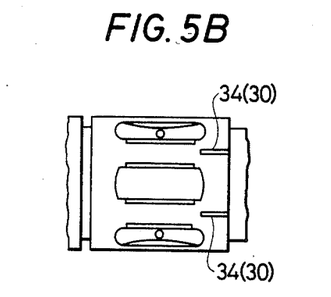

In a third embodiment shown in FIGS. 5A and 5B, one end of each of communication slots 34 axially formed at the outer periphery of the rotor 14 is connected to an annular space 33 formed at one end of each of the rotor 14 and the sleeve 15 and into which highly pressurized oil in the oil pump P flows in a constant manner. Further, the other end of each of the slots 34 is connected to the passage slots 15a, which are in turn connected to the oil tank T at the sleeve 15. In this manner, the left cylinder chamber CL is placed in communication with the right cylinder chamber CR.

Figure 6A:
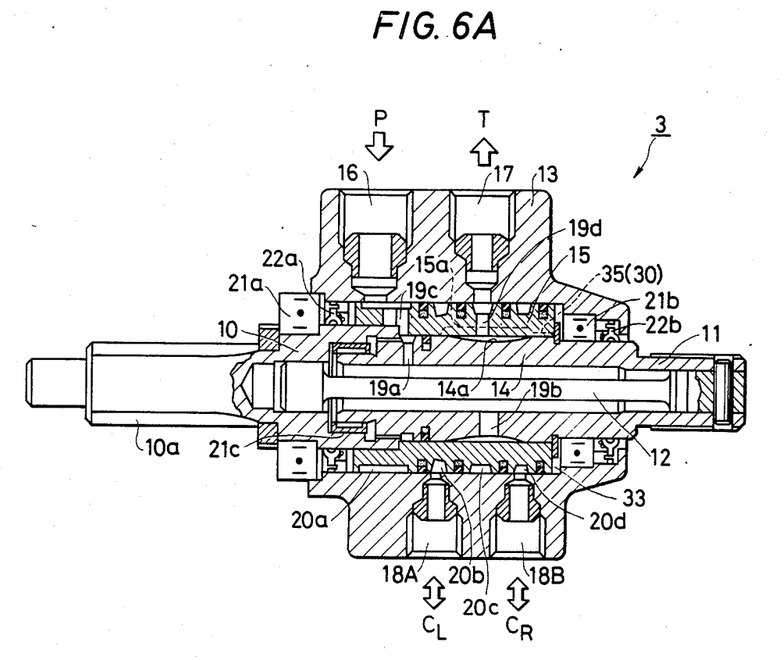
Figure 6B:
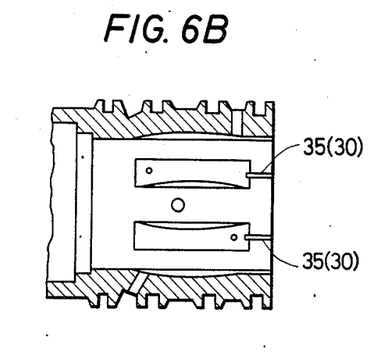

In a fourth embodiment shown in FIGS. 6A and 6B, communication passages 35 extending axially from the respective passage slots 15a at the inner periphery of the sleeve 15 are connected to the annular space 33. In this manner, the left cylinder chamber CL communicates with the right cylinder chamber CR.

Figure 7A:
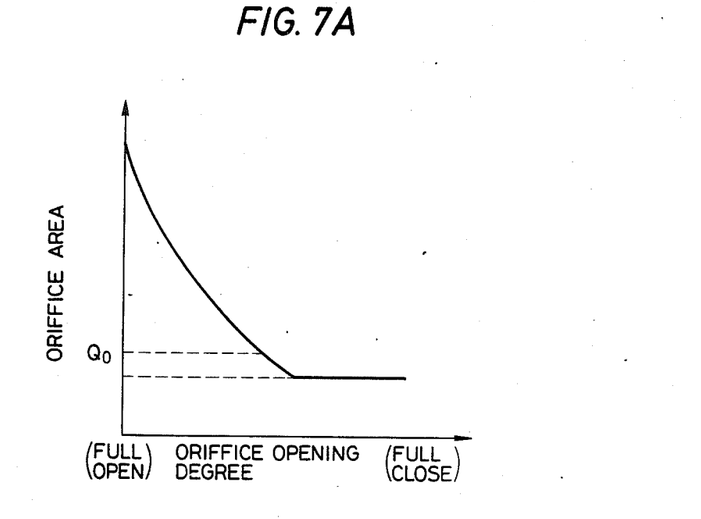
FIGS. 7A and 7B are graphic representations respectively showing the relationship between the state of opening and the opening area of the orifice in the power steering apparatus according to the present invention and the relationship between the input torque and the rack thrust thereof.
Figure 7B:
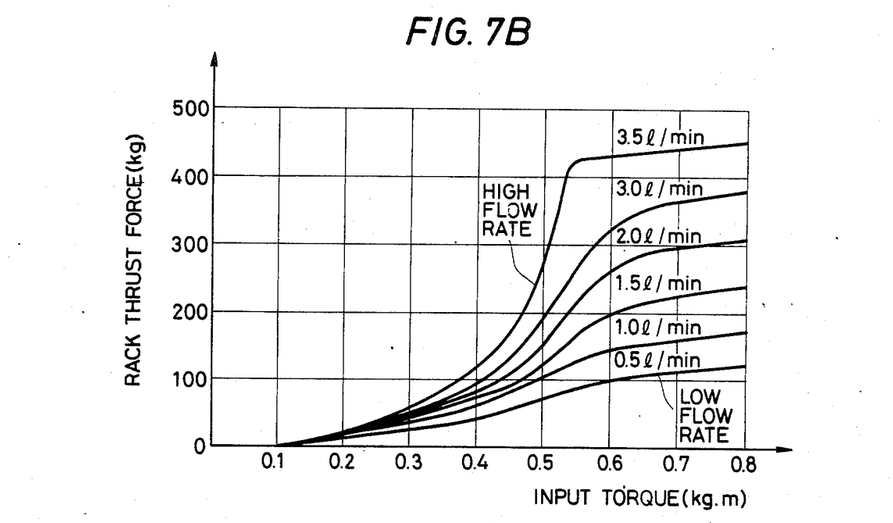

With such an arrangement, the left and right cylinder chambers CL and CR in the power cylinder are constantly in communication with each other by means of the small holes 31, communication slots 32 and 34, or communication passages 35 formed in the rotor of the control valve 3. Consequently, in the event that the control valve 3 shown in FIG. 1 is completely closed upon steering, the hydraulic circuits still remain communicated since the stationary orifice 30 is slightly opened, as is clear from a characteristic curve shown in FIG. 7A. Accordingly, under the influence of the stationary orifice 30, the pressure in the pressurized oil feel line is prevented from increasing. As shown in FIG. 7B, wide variations in the flow rate of the pressurized oil are rendered possible.

It should be mentioned that the opening area of the stationary orifice 30 is made smaller than a working area Q0 of the orifice in the control valve 3 when the pressure in the hydraulic circuit increases and relief pressure is generatd by the pressure control valve in the oil pump P.

With these arrangement, a desirably wide range of steering properties is obtained, particularly when the car travels at high speed, thereby improving the overall steering performance. Furthermore, by appropriately changing the opening area of the stationary orifice 30, input and ouput characteristics as shown in FIG. 7B can be varied. Such arrangement provides excellent steering properties to meet various needs.

Figure 8A:
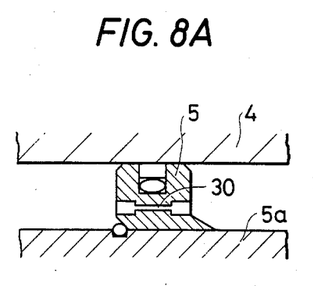
FIGS. 8A, 8B, 8C and 8D and FIG. 9 show further embodiments of the present invention.
Figure 8B:
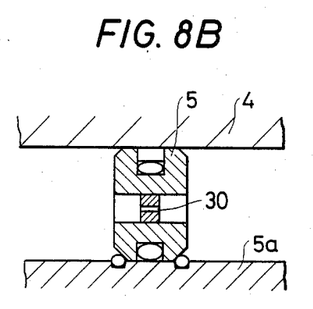
Figure 8C:
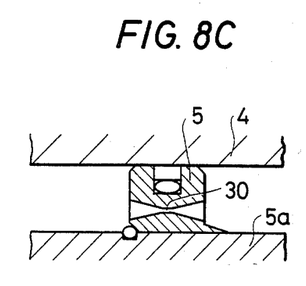
Figure 8D:
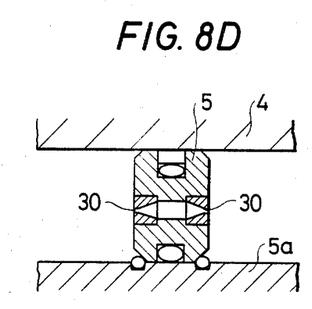

It is to be understood that the invention is not limited to the specific embodiments described and that various changes and modifications may be made thereto. For instance, in the above embodiments, holes or slots are formed at the rotor 14 or the sleeve 15 in the control valve 3 serving as the stationary orifice 30 featured in the invention. It is apparent, however, that the stationary orifice 30 may be integrally or independently formed in the piston 5 in the power cylinder 4 (servo) as shown in FIGS. 8A, 8B, 8C and 8D. In FIGS. 8C and 8D, the stationary orifice 30 is formed with a tapered configuration for the purpose of reducing noise. Reference numeral 5a designates a piston rod.

Figure 9:
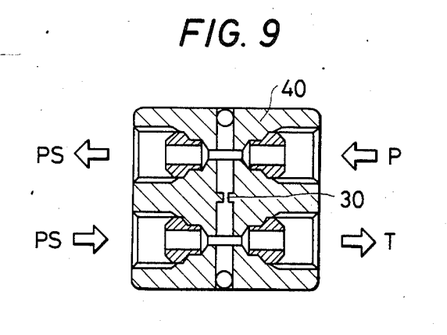

Additionally, as shown in FIG. 9, a connecting unit 40 may be provided between the pressurized oil feed line at the downstream side of the flow control section 7 and the return line connected to the oil tank T Further, in the foregoing embodiments, it is possible to reverse the ports 16 and 17 in their roles as return and input ports, respectively, as illustrated for example in FIG. 4. In this case, a more preferable effect is obtainable since the oil seal 22b is not subjected to high fluid pressure.

As described above, in the power steering apparatus according to the present invention, a stationary orifice having an slight opening is provided so as to communicate the pressurized oil feed line with the return line directed to the oil tank at the downstream of the flow control valve. The apparatus of the invention is thus simple in structure and is inexpensive to manufacture, yet wide variations in input torque may readily be obtained responsive to speed and the like. Thus, the steering wheel always has the "feel" appropriate for existing conditions, namely, light at low and normal speeds and heavy at high speeds. Such steering properties are advantageous, particularly at high speeds. Also, the invention can easily be applied to a conventional power steering apparatus. By changing the opening area of the orifice, a suitable steering force is obtainable responsive to the steering angle or the like, thereby providing excellent steering properties.

We claim:

1. In a power steering apparatus comprising an oil pump adapted to supply pressurized oil from an oil tank to a flow control valve, said flow control valve being operable to selectively supply said oil to either a left or a right cylinder chamber of a power cylinder, and being adapted to return part of the pressurized oil discharged from said oil pump to said oil tank, the improvement wherein at least one orifice having a small opening is provided communicating a pressurized oil feed line directed to one of said chambers in said power cylinder with a return line directed to said oil tank from the other one of said chambers in said power cylinder at a downstream side of said flow control valve.

2. The power steering apparatus of claim 1, wherein said at least one orifice is first and second radially extending small holes formed in a rotor of said valve open to passage slots connected to said oil tank at a sleeve of said valve.

3. The power steering apparatus of claim 1, wherein said at least one orifice is first and second narrow communications slot formed circumferentially on an outer surface of a rotor of said valve interconnecting passage slots formed at an outer periphery of said rotor.

4. The power steering apparatus of claim 1, wherein said at least one orifice is two communication slots formed axially at an outer periphery of a rotor of said valve connecting to an annular space formed at one end of each of said rotor and a sleeve of said valve into which high pressure oil from said pump flows in a constant manner.

5. The power steering apparatus of claim 1, wherein said at least one orifice is two communication passages extending axially from respective passage slots formed in an inner periphery of a sleeve of said valve and connecting to an annular space formed at one end of said sleeve.

6. The power steering apparatus of claim 1, wherein said at least one orifice is formed in a piston of said power cylinder, communicating two chambers of said power cylinder.

7. The power steering apparatus of claim 1, wherein said at least one orifice is a communication passage between a pressurized oil feed line at a downstream side of a flow control section of said valve and a return line connected to said oil tank.

8. The power steering apparatus of claim 1, wherein said at least one orifice has a tapered configuration.

* * * * *